Feb. 21, 1956 B. F. BORSODY 2,735,341
REFLECTIVE TRAFFIC SIGNAL SPOTTER
Filed Sept. 26, 1951
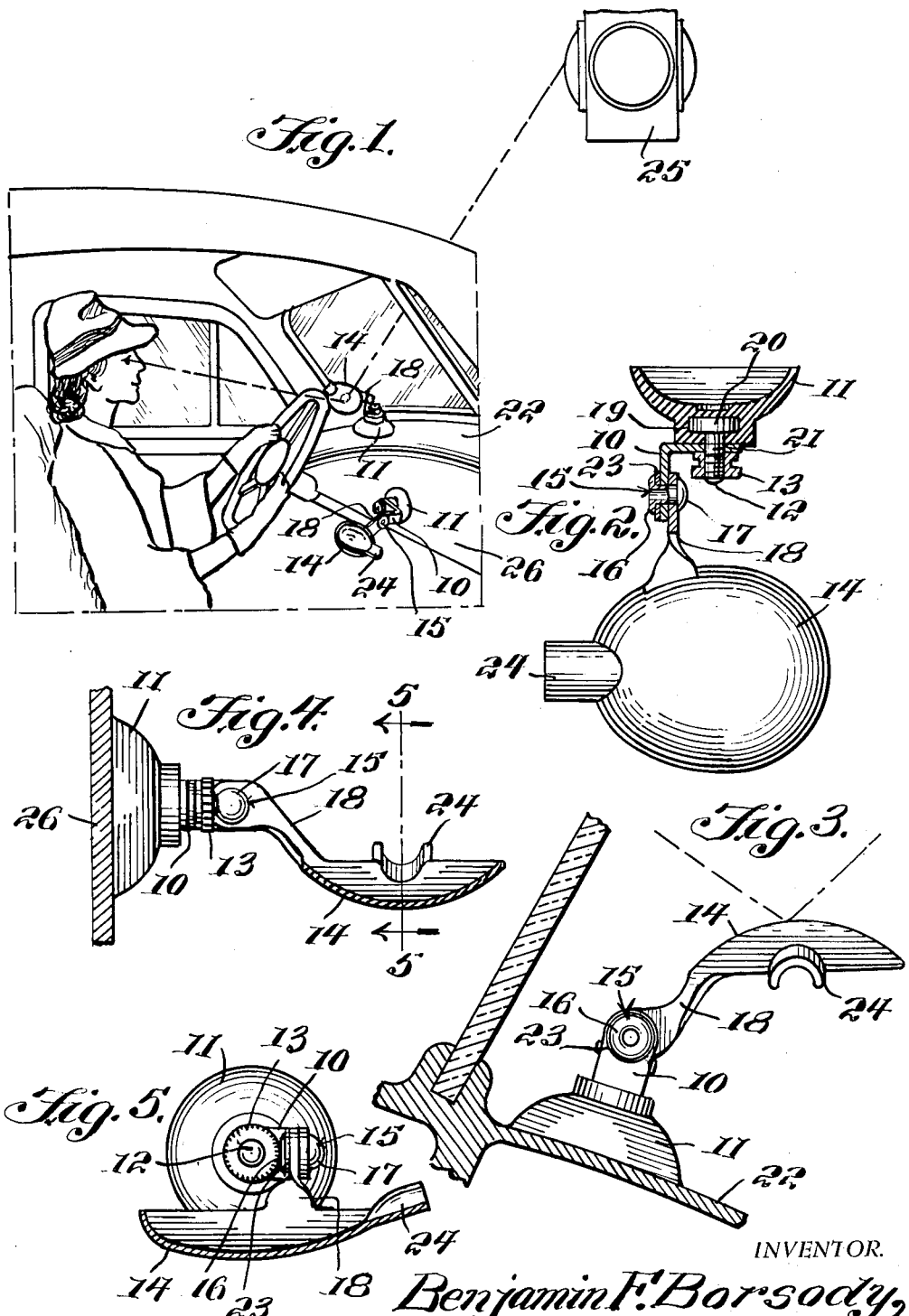
INVENTOR.
Benjamin F. Borsody,
BY Victor J. Evans & Co.
ATTORNEYS UnitedStates Patent Office 2,735,341
Patented Feb. 21, 1956

2,735,341

REFLECTIVE TRAFFIC SIGNAL SPOTTER

Benjamin F. Borsody, Arlington, Va.

Application September 26, 1951, Serial No. 248,423

1 Claim. (Cl. 88—81)

This invention relates to brackets for positioning mirrors in motor vehicles, and in particular a bracket having a saucer or spoon shaped mirror with a vacuum cup adjustably attached to the bracket and with the parts arranged whereby with the mirror positioned on the cowl of a motor vehicle inside of the windshield a traffic signal directly above the forward end of the vehicle may readily be observed from the driver's seat, and the parts are also arranged whereby the mirror section of the device may be turned over and the opposite side used as an ash-tray.

The purpose of this invention is to facilitate driving in traffic where traffic signals are positioned on poles at the side of a highway and where it is necessary to look substantially straight upwardly to view the signal.

With the conventional type of motor vehicle mirror it is possible to see the highway at the rear and also toward either side, however, it is difficult to see a traffic signal positioned directly above the forward end of a vehicle. With this thought in mind this invention contemplates a bracket wherein a small mirror is supported by a vacuum cup so that the mirror may be positioned on the cowl or instrument board of the vehicle and wherein the position thereof may readily be changed to compenate for different positions of traffic signals whereby the operator of a vehicle may observe the signal substantially directly above the vehicle.

The object of this invention is, therefore, to provide means for providing an adjustable mounting for a mirror whereby the mirror may be positioned on the cowl of a motor vehicle and may be moved to a suitable position whereby the operator of the vehicle may observe a signal above the forward end of the vehicle.

Another object of the invention is to provide an adjustable mounting for a mirror whereby the mirror may also be used as an ash-tray in a motor vehicle.

A further object of the invention is to provide a motor vehicle mirror that may readily be moved from one position to another and that is formed whereby the device provides a mirror in one position and an ash-tray in another position and in which the device is of a simple and economical construction.

With these and other objects and advantages in view the invention embodies an L-shaped bracket having a vacuum cup adjustably mounted on one arm with a saucer or spoon shaped mirror adjustably mounted on the other, and in which the parts are positioned whereby the device may readily be installed in different positions in a motor vehicle or used on a telephone hand set stand or other device.

Other features and advantages of the invention will appear from the following description taken in connection with the drawings wherein:

Figure 1 is an elevational view showing part of the forward end of a vehicle, illustrating a plurality of the devices of this invention positioned in the vehicle with one positioned to observe a traffic light above the vehicle and the other positioned to be used as an ash-tray.

Figure 2 is a plan view of the device with the mounting bracket and vacuum cup shown in section.

Figure 3 is a detail showing a side elevational view of the device with the vacuum cup positioned on the cowl of a motor vehicle and with the reflecting surface positioned to observe a traffic signal above the vehicle, the parts being shown on an enlarged scale.

Figure 4 is a side elevational view with parts broken away and shown in section illustrating the device in a position in which it provides an ash-tray.

Figure 5 is a cross section through the mirror or reflecting section of the device being taken on line 5—5 of Figure 4.

Referring now to the drawings wherein like reference characters denote corresponding parts the motor vehicle mirror of this invention includes an L-shaped bracket 10 having a vacuum cup mounting leg and a mirror holding leg, a vacuum cup 11 secured to the bracket with a stud 12 having a thumb nut 13 thereon and a spoon shaped reflector 14 which is secured to the bracket 10 with a friction rivet 15 having a base 16 on one end and a head 17 on the other and which extends through an arm 18 extended from the bowl of the reflector.

The vacuum cup 11 is provided with a socket 19 in which a head 20 of a stud 12 is positioned and with the stud 12 extended through an opening 21 in one arm of the bracket 10, the vacuum cup may be secured to the outer surface of a cowl 22 of a motor vehicle, as illustrated in Figures 1 and 3, and the position of the bracket 10 on the vacuum cup may be turned so that the reflecting surface may be conveniently positioned.

A friction washer 23 may be provided on the rivet or stud 15 whereby the part 14 may also be adjusted to a suitable position.

With the part 14 having a convex reflecting surface on one side and a concave surface on the other the device provides a reflector when positioned as shown in Figures 1 and 3 and may be used as an ashtray when suspended as illustrated in Figures 4 and 5.

The part 14 is provided with an arcuate extension 24 for holding cigarettes, and the like when the device is used as an ash-tray.

Both the inner and outer surfaces of the member 14 may be provided with reflecting coatings whereby either side may be used as a reflector.

With the parts assembled in this manner the device may readily be moved from one position to another in a motor vehicle whereby it may be used to observe a signal, as indicated by the numeral 25, or it may also be used to provide vision from the sides or rear of the vehicle and, also as illustrated in Figure 1, it may be positioned on an instrument board 26 or other part of the vehicle and inverted to provide an ash-tray.

It will be understood that modifications may be made in the design and arrangement of the parts without departing from the spirit of the invention.

What is claimed is:

In a traffic signal spotter, the combination which comprises an L-shaped bracket having a vacuum cup mounting leg and a mirror holding leg, each of said legs having openings therethrough, a vacuum cup having a socket therein, a threaded stud having a head positioned with said head in the socket of the vacuum cup and with a threaded portion thereof extended through the opening in the vacuum cup mounting leg of the bracket, a thumb nut on the threaded portion of said stud for retaining the bracket in adjusted positions with relation to the stud, said thumb nut being arranged on the opposite side of said lug from said vacuum cup, a spoon shaped reflector having a bowl with an arm extended from one side and said bowl having a concave surface on the inside and a convex surface on the outside, said arm being arranged in superposed relation with respect to the mirror holding leg of said bracket, both of said inside and outside surfaces of the bowl being reflecting, and a friction rivet extending through the opening in the mirror holding leg for adjustably securing the arm of the bowl to the mirror holding leg of the bracket.

References Cited in the file of this patent

UNITED STATES PATENTS

| | | |
|---|---|---|
| 75,033 | Logan | Mar. 3, 1868 |
| 954,752 | Marks | Apr. 12, 1910 |
| 1,332,145 | Pyle | Feb. 24, 1920 |
| 1,358,159 | Kern | Nov. 9, 1920 |
| 1,610,252 | Browne | Dec. 14, 1926 |
| 1,622,157 | Law | Mar. 22, 1927 |
| 1,650,479 | Woodland | Nov. 22, 1927 |
| 1,750,947 | Vons | Mar. 18, 1930 |
| 1,921,755 | Karlson | Aug. 8, 1933 |
| 2,145,836 | Parkins | Jan. 31, 1939 |
| 2,519,222 | Brooks | Aug. 15, 1950 |
| 2,549,541 | Squiers | Apr. 17, 1951 |